United States Patent
Cha et al.

(10) Patent No.: US 10,040,492 B2
(45) Date of Patent: Aug. 7, 2018

(54) VARIABLE SPOILER APPARATUS OF REAR BUMPER FOR VEHICLE

(71) Applicants: Hyundai Motor Company, Seoul (KR); Kia Motors Corporation, Seoul (KR)

(72) Inventors: Dong Eun Cha, Seongnam-si (KR); Jin Young Yoon, Gimpo-si (KR); Hyun Gyung Kim, Hwaseong-si (KR); Soo Hyun Hyun, Gyeongju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/610,375

(22) Filed: May 31, 2017

(65) Prior Publication Data

US 2018/0134329 A1    May 17, 2018

(30) Foreign Application Priority Data

Nov. 15, 2016  (KR) .......................... 10-2016-0151735

(51) Int. Cl.
  *B62D 35/00*  (2006.01)
  *B62D 35/02*  (2006.01)
  *B62D 37/02*  (2006.01)

(52) U.S. Cl.
  CPC .......... *B62D 35/007* (2013.01); *B62D 37/02* (2013.01); *B62D 35/00* (2013.01); *B62D 35/02* (2013.01)

(58) Field of Classification Search
  CPC .............................. B62D 35/007; B62D 35/02

USPC ....................................................... 296/180.5
See application file for complete search history.

(56) References Cited

U.S. PATENT DOCUMENTS

| | | | |
|---|---|---|---|
| 5,165,751 A | 11/1992 | Matsumoto et al. | |
| 7,481,482 B2 | 1/2009 | Grave et al. | |
| 7,717,494 B2 | 5/2010 | Nagahama | |
| 7,841,646 B2 | 11/2010 | Paul et al. | |
| 9,168,960 B2 | 10/2015 | Lee et al. | |
| 9,174,687 B2 | 11/2015 | Jeong et al. | |
| 9,527,535 B1 * | 12/2016 | Cha .................... | B62D 35/007 |
| 2004/0256885 A1 | 12/2004 | Bui | |

(Continued)

FOREIGN PATENT DOCUMENTS

| DE | 102011103787 A1 | 12/2012 |
|---|---|---|
| DE | 102013101296 A1 | 8/2014 |

(Continued)

*Primary Examiner* — Gregory A Blankenship
(74) *Attorney, Agent, or Firm* — Slater Matsil, LLP (57) ABSTRACT

Disclosed is a variable spoiler apparatus of the rear bumper for vehicles. The variable spoiler apparatus includes a linkage device, installed on a bumper back beam, and varies in length in an up-down direction during a rotation. A spoiler is coupled to the linkage device and is able to move in the up-down direction by the rotation of the linkage device. A first drive device is installed on the bumper back beam. The first drive device is provided with a first rotating shaft coupled to the linkage device to transmit rotating force. A guide is rotatably installed on the bumper back beam and is able to extend in the up-down direction. A second drive device is coupled to the guide so as to be movable in the up-down direction. When the second drive device is operated, the spoiler is tilted by a length variation operation of the length-variable unit.

20 Claims, 4 Drawing Sheets

(56) References Cited

U.S. PATENT DOCUMENTS

| | | |
|---|---|---|
| 2007/0145776 A1 | 6/2007 | Grave et al. |
| 2017/0050684 A1* | 2/2017 | Kim ...................... B62D 35/007 |
| 2017/0113741 A1* | 4/2017 | Wolf ....................... B62D 35/02 |
| 2017/0120968 A1* | 5/2017 | Povinelli ............... B62D 35/005 |
| 2018/0009402 A1* | 1/2018 | Cha ........................ B60R 19/023 |
| 2018/0093716 A1* | 4/2018 | Povinelli ................ B62D 37/02 |

FOREIGN PATENT DOCUMENTS

| | | |
|---|---|---|
| JP | 07137668 A | 5/1995 |
| JP | 2006219074 A | 8/2006 |
| JP | 2006248355 A | 9/2006 |
| JP | 2009248746 A | 10/2009 |
| KR | 101363078 B1 | 2/2014 |
| KR | 101526735 B1 | 6/2015 |
| KR | 20150072715 A | 6/2015 |

* cited by examiner

VARIABLE SPOILER APPARATUS OF REAR BUMPER FOR VEHICLE

CROSS-REFERENCE TO RELATED APPLICATIONS

The present application claims priority of Korean Patent Application No. 10-2016-0151735 filed on Nov. 15, 2016, the entire contents of which is incorporated herein for all purposes by this reference.

TECHNICAL FIELD

The present invention relates to a variable spoiler apparatus of a rear bumper for vehicles.

BACKGROUND

Generally, when vehicles travel at high speeds or turn, the grip force of rear wheel tires is reduced. The reduction in grip force is disadvantageous for the vehicle to increase the speed, and causes deterioration in the driving stability of the vehicle.

To overcome the above-mentioned problems, an air spoiler is installed in the rear of the vehicle. The air spoiler changes the flow of air passing around a vehicle so that the pressure of pushing the vehicle can be generated by the flow of air around the air spoiler, thus increasing the grip force of the rear wheel tires.

Such an air spoiler is typically installed on the rear end of a vehicle. In this regard, the degree of freedom in design is limited. Once the air spoiler has been installed, it is difficult to change the design. In the case where the air spoiler is applied to a high-quality vehicle, there is a problem in that the design quality may deteriorate due to the installation of the air spoiler.

As such, the air spoiler is limited as a technique for improving the aerodynamic performance to enhance the fuel efficiency and driving stability of the vehicle. There is a problem in that the shape of the vehicle or the specifications of the air spoiler must be changed to additionally improve the aerodynamic performance.

The foregoing is intended merely to aid in the understanding of the background of the present invention, and is not intended to mean that the present invention falls within the purview of the related art that is already known to those skilled in the art.

SUMMARY

Accordingly, the present invention has been made keeping in mind the above problems occurring in the related art, and the present invention is intended to propose a variable spoiler apparatus of a rear bumper for a vehicle which is housed in a lower portion of the rear bumper and, as needed, is extracted downward from the rear bumper so as to control the air flow, thus making it possible to enhance the driving stability and aerodynamic performance of the vehicle.

According to one aspect, there is provided a variable spoiler apparatus of a rear bumper for a vehicle, including: a linkage device installed on a bumper back beam and configured to vary in length in an up-down direction during a rotating operation; a spoiler coupled to the linkage device and configured to be moved in the up-down direction by rotation of the linkage device; a first drive device installed on the bumper back beam and provided with a first rotating shaft coupled to the linkage device to transmit rotating force, the first drive device being configured such that, when the first drive device is operated, the linkage device is rotated by rotation of the first rotating shaft so that the spoiler is moved in the up-down direction; a guide rotatably installed on the bumper back beam and configured so as to be extendable in the up-down direction; and a second drive device coupled to the guide so as to be movable in the up-down direction and provided with a length-variable unit coupled to an end of the spoiler, the second drive device being configured such that when the linkage device is rotated, the second drive device along with the spoiler moves in the up-down direction along the guide, and when the second drive device is operated, the spoiler is tilted by a length variation operation of the length-variable unit.

The linkage device may include: a fixing bracket fixed to the bumper back beam, and to which the first rotating shaft is penetrated and connected; a drive link including a first end that is installed on the fixing bracket and coupled with the first rotating shaft so that the drive link rotates along with the first rotating shaft; a support link including a first end rotatably coupled to the fixing bracket through a connection link, and a second end rotatably coupled to the spoiler; and a driven link including a first end rotatably coupled to the drive link, and a second end rotatably coupled to the second link of the support link.

The drive link and the driven link may be configured such that, when the spoiler is completely moved downward, the drive link and the driven link that have been in a folded state are unfolded to have an approximately vertical orientation.

The driven link may extend from the first end thereof to the second end in a curved shape.

The connection link may be rotatably coupled at a first end thereof to the fixing bracket, and be rotatably coupled at a second end thereof to the first end of the support link, and the connection link may comprise a plurality of connection links provided parallel with each other.

The linkage device may be configured such that the drive link, the driven link, the connection link and the support link are unfolded to form a triangular shape when the spoiler is completely moved downward.

The first drive device may include: a first motor installed on a back beam bracket fixed on the bumper back beam and configured to transmit rotating force; and a first rotating shaft extending in opposite directions from the first motor, and penetrated into the fixing bracket and connected to the drive link.

The guide may have a guide slot extending in the up-down direction. The second drive device may include an up-down movable member provided with a guide shaft that is disposed in the guide slot of the guide, and the up-down movable member may be coupled with the length-variable unit coupled to the spoiler.

The guide may comprise a plurality of guides disposed to have a symmetrical structure on opposite sides of the second drive device. The guide shaft of the up-down movable member may extend in opposite directions and be inserted in the guide slots of the guides disposed on the opposite sides.

The length-variable unit may include: a rotating bracket rotatably installed on the end of the spoiler; a second motor installed on the up-down movable member and configured to transmit rotating force; and a connection shaft extending from the second motor and threadedly coupled to the rotating bracket so that, when the second motor is operated, the rotating bracket is moved in the up-down direction by rotation of the connection shaft.

The bumper back beam may be installed in a rear of the vehicle. When the spoiler is moved downward, the spoiler may be extracted forward in a diagonal direction.

The length-variable unit of the first drive device may be coupled to a front end of the spoiler.

In a variable spoiler apparatus of a rear bumper for vehicles according to the present invention, a spoiler is housed in a lower portion of the rear bumper and, as needed, is extracted downward from the rear bumper so as to control the air flow, thus making it possible to enhance the driving stability and aerodynamic performance of the vehicle.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF ILLUSTRATIVE EMBODIMENTS

The present invention relates to a variable spoiler apparatus of a rear bumper for vehicles which is moved downward or upward under a rear bumper so as to control an air flow.

Hereinafter, a variable spoiler apparatus of a rear bumper for vehicles according to an embodiment of the present invention will be described with reference to the attached drawings.

Figure 1:
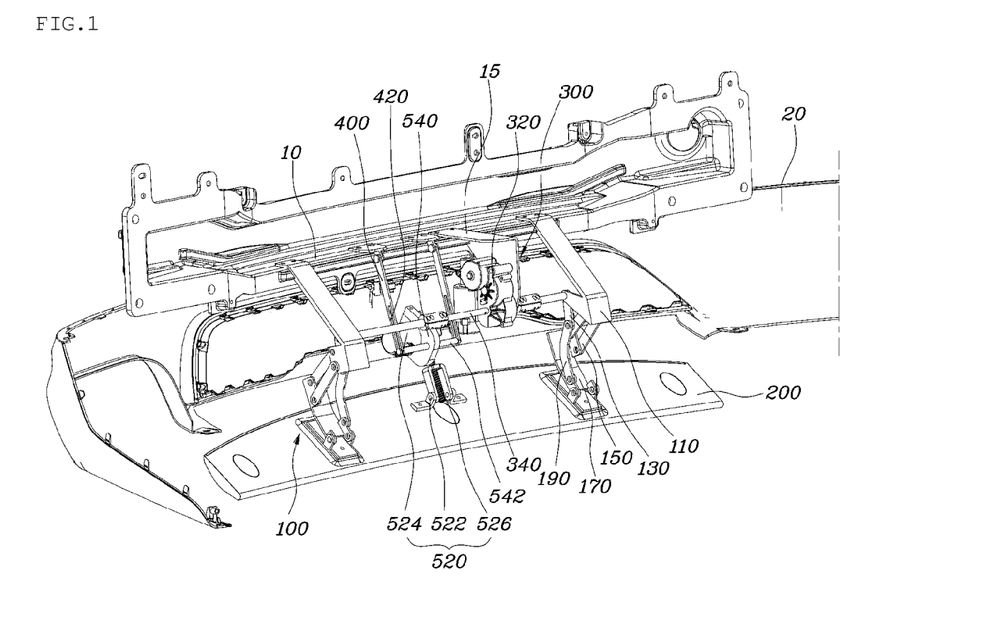
FIG. 1 is a perspective view illustrating a variable spoiler apparatus of a rear bumper for vehicles according to an embodiment of the present invention.
Figure 2:
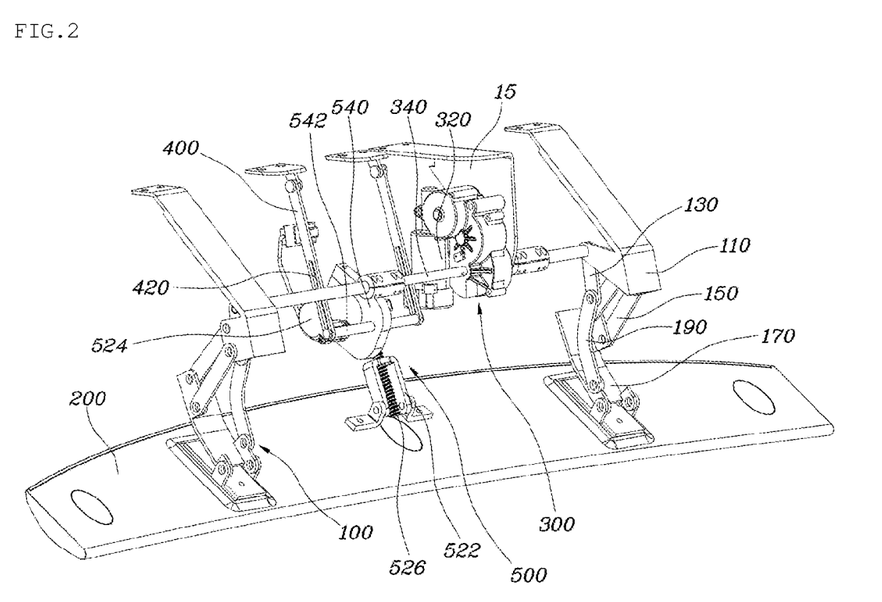
FIG. 2 is a view illustrating the variable spoiler apparatus of the rear bumper for vehicles shown in FIG. 1.
Figure 3:
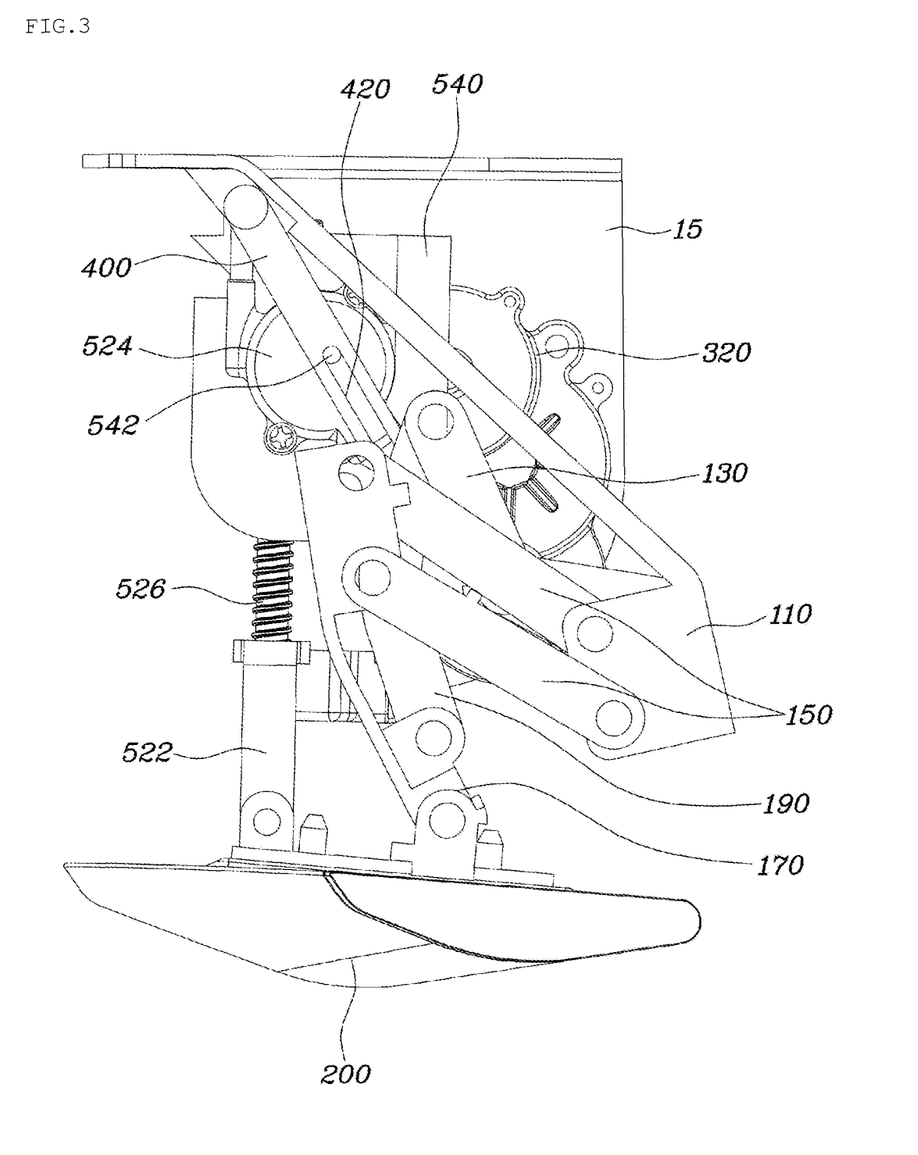
FIGS. 3 and 4 are views illustrating the operation of the variable spoiler apparatus of the rear bumper for vehicles shown in FIG. 1.
Figure 4:
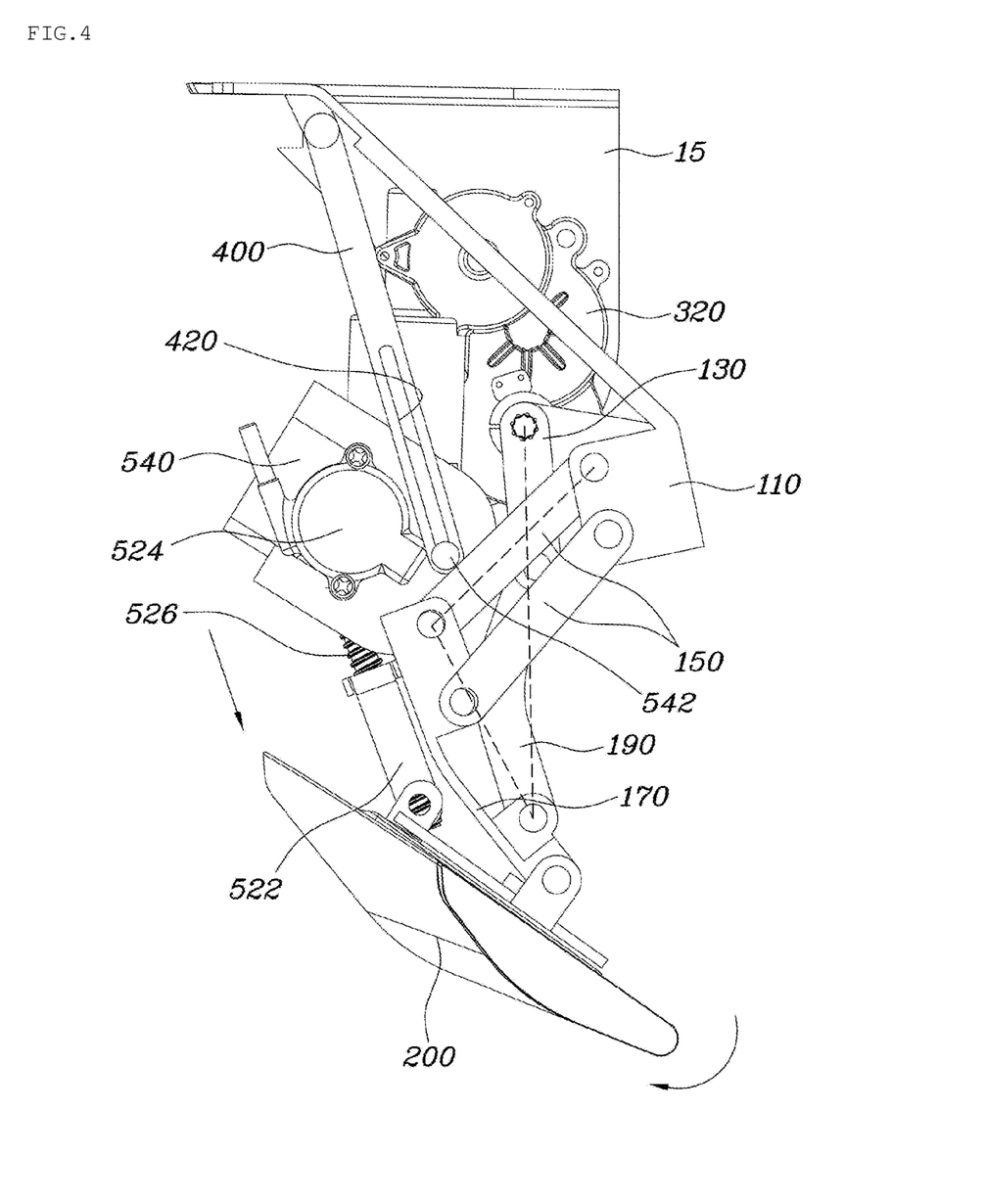

FIG. 1 is a perspective view illustrating a variable spoiler apparatus of a rear bumper for vehicles according to an embodiment of the present invention. FIG. 2 is a view illustrating the variable spoiler apparatus of the rear bumper for vehicles shown in FIG. 1. FIGS. 3 and 4 are views illustrating the operation of the variable spoiler apparatus of the rear bumper for vehicles shown in FIG. 1.

As shown in FIG. 1, the variable spoiler apparatus of the rear bumper for vehicles according to an embodiment of the present invention includes: a linkage device 100 which is installed on a bumper back beam 10 and configured to vary in length in an up-down direction during a rotating operation; a spoiler 200 which is coupled to the linkage device 100 and configured to be moved upward or downward by the rotation of the linkage device 100; a first drive device 300 which is installed on the bumper back beam 10 and provided with a first rotating shaft 340 coupled to the linkage device 100 to transmit rotating force, and which is configured such that, when the first drive device 300 is operated, the linkage device 100 is rotated by the rotation of the first rotating shaft 340 so that the spoiler 200 is moved upward or downward; a guide 400 which is rotatably installed on the bumper back beam 10 and provided so as to be extendable in the up-down direction; and a second drive device 500 which is connected to the guide 400 so as to be movable in the up-down direction and provided with a length-variable unit 520 connected to an end of the spoiler 200, and which is configured such that when the linkage device 100 is rotated, the second drive device 500 along with the spoiler 200 moves upward or downward along the guide 400, and when the second drive device 500 is operated, the spoiler 200 is tilted by a length variation operation of the length-variable unit 520.

As such, an embodiment of the present invention is formed of the linkage device 100, the spoiler 200, the first drive device 300, the guide 400, and the second drive device 500. The linkage device 100 may be provided to have a symmetrical structure on opposite sides of the spoiler 200. The linkage device 100 is fixed to the bumper back beam 10. The bumper back beam 10 may be a rear bumper back beam 10 which is provided on a rear bumper. The linkage device 100 may be formed of a plurality of links and configured such that, when the links are rotated and thus folded or unfolded, the length of the linkage device 100 varies in the up-down direction.

The spoiler 200 is connected to the linkage device 100 so that the spoiler 200 moves upward or downward as the length of the linkage device 100 varies in the up-down direction. In an original state, the spoiler 200 is housed in a bumper cover 20 provided on the bumper back beam 10. When the spoiler 200 is moved downward from the bumper cover 20 and disposed below the bumper cover 20, the spoiler 200 can be used to control the air flow. The spoiler 200 may be formed in a shape capable of appropriately controlling the air flow when the spoiler 200 is in an exposed state below the rear bumper. The shape of the spoiler 200 may change in various ways depending on the types of vehicles.

In accordance with an embodiment of the present invention, a first drive device 300 is provided, which controls the rotation of the linkage device 100 so as to embody the upward or downward movement of the spoiler 200. In detail, the first drive device 300 is installed on the bumper back beam 10 and provided with the first rotating shaft 340 that is coupled to the linkage device 100 to transmit rotating force. When the first drive device 300 is operated, the linkage device 100 is rotated by the rotation of the first rotating shaft 340 so that the spoiler 200 is moved upward or downward. As such, the first drive device 300 transmits rotating force to the linkage device 100 through the first rotating shaft 340. That is, depending on whether the first drive device 300 is in operation, the linkage device 100 is rotated so that the spoiler 200 is moved upward or downward and thus retracted into the bumper cover 20 or extracted therefrom.

Particularly, to embody the function of controlling the air flow, the spoiler 200 according to an embodiment of the present invention may not only be moved upward or downward but may also be tilted.

For this, the second drive device 500 is coupled to the guide 400 that is rotatably installed on the bumper back beam 10, whereby the second drive device 500 is guided in the up-down direction. Furthermore, the second drive device 500 is connected to the spoiler 200 through the length-variable unit 520 so that when the second drive device 500 is operated, the spoiler 200 can be tilted. That is, when the spoiler 200 is moved upward or downward by the operation of the first drive device 300, the second drive device 500, the length-variable unit 520 of which is connected to the spoiler 200, is moved upward or downward along with the spoiler 200, wherein because the second drive device 500 is connected to the guide 400 installed on the bumper back beam 10, the second drive device 500 is moved upward or downward along the longitudinal direction of the guide 400. For example, after the second drive device 500 along with the spoiler 200 has been moved downward, when the length-variable unit 520 coupled to the end of the spoiler 200 is operated, the spoiler 200 can be tilted by variation in length of the length-variable unit 520. As such, when the spoiler 200 is moved upward or downward by the rotation of the linkage device 100 as the first rotating shaft 340 is rotated by the operation of the first drive device 300, the second drive device 500 is moved along with the spoiler 200 in the same direction. Because the length-variable unit 520 is connected to the end of the spoiler 200, the end of the spoiler 200 can be pulled or pushed upward or downward by variation in length of the length-variable unit 520. In this way, the spoiler 200 can be tilted.

As such, the spoiler 200 according to an embodiment of the present invention is moved upward or downward and housed into the rear bumper or extracted therefrom depending on the operation of the first drive device 300. When in the extracted state, the spoiler 200 is tilted by the operation of the second drive device 500 so as to control the air flow.

Embodiments of the present invention will be described in more detail below. As shown in FIG. 2, the linkage device 100 includes: a fixing bracket no which is fixed to the bumper back beam 10, and to which the first rotating shaft 340 is penetrated and connected; a drive link 130 a first end of which is installed on the fixing bracket 110 and connected to the first rotating shaft 340 so that the drive link 130 can be rotated along with the first rotating shaft 340; a support link 170 a first end of which is rotatably connected to the fixing bracket 110 through a connection link 150, and a second end of which is rotatably connected to the spoiler 200; and a driven link 190 a first end of which is rotatably connected to the drive link 130, and a second end of which is rotatably connected to the second end of the support link 170.

The linkage device 100 having the above-mentioned configuration forms a link structure formed of the drive link 130, the connection link 150, the support link 170 and the driven link 190 which connect the fixing bracket 110 with the spoiler 200. That is, the first rotating shaft 340 extending from the first motor 320 is penetrated and connected to the fixing bracket 110. The first end of the drive link 130 is rotatably connected to the fixing bracket 110 such that the drive link 130 is rotated along with the first rotating shaft 340. Thus, when the first motor 320 is operated, the first rotating shaft 340 is rotated, whereby the drive link 130 is rotated. The first end of the driven link 190 is connected to a second end of the drive link 130. The second end of the driven link 190 is rotatably connected to the second end of the support link 170. The second end of the support link 170 is hinged to the spoiler 200 so as to be rotatable. Thus, when the first motor 320 is operated, the spoiler 200 can be moved by rotation of the drive link 130, the driven link 190 and the support link 170. In this regard, the spoiler 200 must be moved upward or downward with respect to the bumper back beam 10. For this, the connection link 150 is rotatably connected to the fixing bracket 110 and the first end of the support link 170. Thereby, when the first motor 320 is operated, the drive link 130 and the driven link 190 are rotated, thus pushing the support link 170, wherein the support link 170 is guided in the up-down direction by the connection link 150 connected to the fixing bracket 110 and the support link 170.

Consequently, the spoiler 200 can be moved in the up-down direction by the drive link 130, the driven link 190, the support link 170 and the connection link 150 that constitute the linkage device 100. All of the links constituting the linkage device 100 are hinged to each other so as to be rotatable relative to each other.

As shown in FIGS. 2 and 4, the drive link 130 and the driven link 190 may be configured such that, when the spoiler 200 is completely moved downward from the folded state, the drive link 130 and the driven link 190 are unfolded to have an approximately vertical orientation.

As such, when the spoiler 200 is completely moved downward, the drive link 130 and the driven link 190 are unfolded to an angle close to the vertical orientation. Thus, the drive link 130 and the driven link 190 are maintained at an angle close to an angle perpendicular to the spoiler 200 so that the support force of the drive link 130 and the driven link 190 can be reliably secured while the spoiler 200 is in the downwardly moved state.

Particularly, since the driven link 190 extends from the first end thereof to the second end in a curved shape, the driven link 190 can be smoothly rotated when the drive link 130 rotates. In detail, as shown in FIG. 2, the driven link 190 extends to be curved in the direction in which the drive link 130 rotates. Thus, when the drive link 130 rotates to move the spoiler 200 downward, the driven link 190 can easily receive the rotating force in the direction in which the drive link 130 rotates, whereby the driven link 190 can smoothly rotate in a predetermined direction following the direction in which the drive link 130 rotates.

The connection link 150 is rotatably connected at a first end thereof to the fixing bracket 110, and is rotatably connected at a second end thereof to the first end of the support link 170. A plurality of connection links 150 may be provided to be parallel with each other. The first end of the connection link 150 is hinged to the fixing bracket no so as to be rotatable, and the second end thereof is hinged to the first end of the support link 170 so as to be rotatable. Thus, when the first motor 320 is operated, the connection link 150 makes the drive link 130, the driven link 190 and the support link 170 rotate in predetermined directions with respect to the up-down direction. Particularly, the connection link 150 is connected to the fixing bracket 110 and the support link 170 and thus supports the spoiler 200 connected to the support link 170. Given this, it is preferable that the connection link 150 have the strength sufficient to overcome the force caused by vehicle-induced wind applied to the spoiler 200. For this, a plurality of connection links 150 may be provided so that the spoiler 200 can be reliably maintained in the correct position even when vehicle-induced wind is applied to the spoiler 200 while the vehicle travels. The plurality of connection links 150 are disposed parallel with each other so that the connection links 150 can be smoothly rotated, and uniformly distribute and support a load applied thereto.

As shown in FIG. 4, the linkage device 100 is configured such that the drive link 130, the driven link 190, the connection link 150 and the support link 170 are unfolded to form a triangular shape when the spoiler 200 is completely moved downward.

As such, if the spoiler 200 is completely moved downward, the drive link 130 and the driven link 190 are unfolded in an approximately linear shape, and the connection link 150 and the support link 170 form a predetermined angle therebetween and have a triangular shape, whereby the linkage device 100 can stably support the spoiler 200 against a load applied to the spoiler 200 when the vehicle travels. For this, the drive link 130, the driven link 190, the connection link 150 and the support link 170 may have different lengths.

As shown in FIG. 2, the first drive device 300 may include: the first motor 320 which is installed on a back beam bracket 15 fixed on the bumper back beam 10 so as to transmit rotating force; and the first rotating shaft 340 which extends in opposite directions from the first motor 320 and is penetrated into the fixing bracket no and connected to the drive link 130.

That is, the first motor 320 is fixed in position because it is installed on the back beam bracket 15 fixed to the bumper back beam 10. The first rotating shaft 340 extending in the opposite directions from the first motor 320 is penetrated and connected to the fixing bracket 110 of the linkage device 100. In this regard, the first rotating shaft 340 is rotatably connected to the fixing bracket no, and the drive link 130 is connected to the first rotating shaft 340 on the fixing bracket 110, whereby the drive link 130 and the first rotating shaft 340 rotate together.

Preferably, the first motor 320 is provided with a gear set having a predetermined reduction ratio, so that the predetermined reduction ratio is applied between the first motor 320 and the spoiler 200 by the gear set, whereby the spoiler 200 can be reliably maintained at a predetermined position in a housed or extracted state. In addition, when the spoiler 200 is in the extracted state, even if the rotating force of the first motor 320 is not transmitted to the spoiler 200, the gear set may support the spoiler 200 against a load of air regardless of the angle at which the extracted spoiler 200 is oriented.

As shown in FIGS. 2 and 4, the guide 400 has a guide slot 420 extending in the up-down direction. The second drive device 500 includes an up-down movable member 540 provided with a guide shaft 542 that is disposed in the guide slot 420 of the guide 400. The up-down movable member 540 is connected with the length-variable unit 520 coupled to the spoiler 200.

As such, the second drive device 500 includes the up-down movable member 540 provided with the length-variable unit 520 that is provided with the guide shaft 542 and coupled to the spoiler 200. The guide shaft 542 of the up-down movable member 540 is disposed in the guide slot 420 of the guide 400 installed on the bumper back beam 10. Thus, when the spoiler 200 is moved upward or downward by the operation of the first drive device 300, the up-down movable member 540 is moved upward or downward along with the spoiler 200. Here, the linkage device 100 is configured such that it is rotated when the spoiler 200 is moved upward or downward. In this regard, the guide 400 to which the up-down movable member 540 is connected is rotatably installed on the bumper back beam 10 so that, in response to the rotation of the linkage device 100, the guide 400 rotates along with the linkage device 100, whereby rotational clearance can be absorbed, and the spoiler 200 and the up-down movable member 540 can be smoothly moved upward or downward.

The guide 400 may comprise a plurality of guides 400 which are disposed to have a symmetrical structure on opposite sides of the second drive device 500. The guide shaft 542 of the up-down movable member 540 may extend in the opposite directions and be inserted in the guide slots 420 of the guides 400 disposed on the opposite sides. As such, because the plurality of guides 400 are disposed on the opposite sides of the second drive device 500, and the guide shaft 542 of the up-down movable member 540 extends to the guides 400 disposed on the opposite sides and is inserted into the guide slots 420 of the guides 400, the up-down movable member 540 can be reliably coupled to the guides 400 and smoothly slide upward or downward.

The length-variable unit 520 includes: a rotating bracket 522 which is rotatably installed on the end of the spoiler 200; a second motor 524 which is installed on the up-down movable member 540 and transmits rotating force; and a connection shaft 526 which extends from the second motor 524 and is threadedly coupled to the rotating bracket 522 so that, when the second motor 524 is operated, the rotating bracket 522 is moved upward or downward by rotation of the connection shaft 526.

The connection shaft 526 may be rotatably coupled to a separate bracket fixed on the end of the spoiler 200. The second motor 524 may be formed of a reversible motor to transmit the rotating force. In particular, the connection shaft 526, which extends from the second motor 524 and is rotated by the rotating force transmitted from the second motor 524, may be formed of a lead screw. A tap hole may be formed in the rotating bracket 522 so that the connection shaft 526 is threadedly coupled with the rotating bracket 522. Thus, when the connection shaft 526 is rotated by the operation of the second motor 524, the rotating bracket 522 can move in the longitudinal direction of the connection shaft 526 along the thread of the connection shaft 526. Therefore, when the second motor 524 of the length-variable unit 520 is operated, the rotating bracket 522 is moved by the rotation of the connection shaft 526. Because the rotating bracket 522 is coupled with the end of the spoiler 200, the spoiler 200 can be tilted in a predetermined direction depending on the direction in which the rotating bracket 522 moves.

In an embodiment of the present invention, the bumper back beam 10 may be installed in the rear of the vehicle and thus applied to the rear bumper. When the spoiler 200 is moved downward, it is extracted forward in a diagonal direction so as to prevent the spoiler 200 from being excessively exposed from the rear bumper. The direction in which the spoiler 200 is extracted when moved downward may be determined depending on the connection structure of the linkage device 100.

Furthermore, the length-variable unit 520 of the first drive device 300 is coupled to the front end of the spoiler 200. Thus, as the front end of the spoiler 200 is moved upward or downward by variation in length of the length-variable unit 520, the spoiler 200 can be tilted in a direction.

In addition, the first drive device 300 is disposed ahead of the second drive device 500. Thus, when the first drive device 300 is operated, the second drive device 500, along with the spoiler 200, moves upward or downward. The angle at which the spoiler 200 is tilted can be controlled by the operation of the second drive device 500.

The first motor 320 and the second motor 524 each may be controlled by a controller. Depending on the speed of the vehicle or whether the vehicle is turning, the first motor 320 and the second motor 524 are selectively operated so that the air flow can be controlled corresponding to the driving conditions of the vehicle.

Hereinbelow, the operation of embodiments of the present invention will be described.

In the state in which the spoiler 200 is housed, as shown in FIG. 3, the first motor 320 of the first drive device 300 is not operated, and the drive link 130 and the driven link 190 that are coupled with the first rotating shaft 340 are in the folded state, whereby the spoiler 200 is maintained in the state in which it is housed in the bumper cover 20.

In this state, if the first motor 320 is operated, as shown in FIG. 4, the drive link 130 is rotated interlocking with the first rotating shaft 340, whereby the driven link 190 is rotated. Thus, the support link 170 coupled with the driven link 190 is guided by the connection link 150 and rotated downward. Consequently, the spoiler 200 connected to the support link 170 is moved downward. Here, the second drive device 500 coupled to the spoiler 200 is moved downward along with the spoiler 200.

After the spoiler 200 and the second drive device 500 have been moved downward, when the second motor 524 is operated, the connection shaft 526 is rotated, so that the rotating bracket 522 moves along the thread of the connection shaft 526. As a result, the spoiler 200 coupled to the rotating bracket 522 is tilted.

As having described, in the variable spoiler apparatus of the rear bumper for vehicles according to embodiments of the present invention, the spoiler is housed in the lower portion of the rear bumper and, as needed, is extracted downward from the rear bumper so as to control the air flow, thus making it possible to enhance the driving stability and aerodynamic performance of the vehicle.

Although an embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A variable spoiler apparatus of a rear bumper for a vehicle, the variable spoiler apparatus comprising:
   a linkage device configured to be installed on a bumper back beam and configured to vary in length in an up-down direction during a rotation operation;
   a spoiler configured to be coupled to the linkage device and configured to be moved in the up-down direction by the rotation operation of the linkage device;
   a first drive device configured to be installed on the bumper back beam, the first drive device provided with a first rotating shaft coupled to the linkage device to transmit rotating force, the first drive device being configured such that, when the first drive device is operated, the linkage device is rotated by a rotation of the first rotating shaft so that the spoiler is moved in the up-down direction;
   a guide configured to be rotatably installed on the bumper back beam and configured so as to be extendable in the up-down direction; and
   a second drive device configured to be coupled to the guide so as to be movable in the up-down direction, the second drive device comprising a length-variable unit coupled to an end of the spoiler, the second drive device being configured such that when the linkage device is rotated, the second drive device along with the spoiler moves in the up-down direction along the guide, and when the second drive device is operated, the spoiler is tilted by a length variation operation of the length-variable unit.

2. The variable spoiler apparatus according to claim 1, wherein the linkage device comprises:
   a fixing bracket fixed to the bumper back beam, and to which the first rotating shaft is penetrated and connected;
   a drive link including a first end that is installed on the fixing bracket and coupled with the first rotating shaft so that the drive link rotates along with the first rotating shaft;
   a support link including a first end rotatably coupled to the fixing bracket through a connection link, and a second end rotatably coupled to the spoiler; and
   a driven link including a first end rotatably coupled to the drive link, and a second end rotatably coupled to the second end of the support link.

3. The variable spoiler apparatus according to claim 2, wherein the drive link and the driven link are configured such that, when the spoiler is completely moved downward, the drive link and the driven link that have been in a folded state are unfolded to have an approximately vertical orientation.

4. The variable spoiler apparatus according to claim 2, wherein the driven link extends from the first end thereof to the second end in a curved shape.

5. The variable spoiler apparatus according to claim 2, wherein the connection link is rotatably coupled at a first end thereof to the fixing bracket, and is rotatably coupled at a second end thereof to the first end of the support link, and the connection link comprises a plurality of connection links provided parallel with each other.

6. The variable spoiler apparatus according to claim 2, wherein the linkage device is configured such that the drive link, the driven link, the connection link and the support link are unfolded to form a triangular shape when the spoiler is completely moved downward.

7. The variable spoiler apparatus according to claim 2, wherein the first drive device comprises:
   a first motor installed on a back beam bracket fixed on the bumper back beam and configured to transmit rotating force; and
   the first rotating shaft extending in opposite directions from the first motor, and penetrated into the fixing bracket and connected to the drive link.

8. The variable spoiler apparatus according to claim 2, wherein the guide has a guide slot extending in the up-down direction, and
   wherein the second drive device comprises an up-down movable member provided with a guide shaft that is disposed in the guide slot of the guide, and the up-down movable member is coupled with the length-variable unit coupled to the spoiler.

9. The variable spoiler apparatus according to claim 8, wherein the guide comprises a plurality of guides disposed to have a symmetrical structure on opposite sides of the second drive device, and
   wherein the guide shaft of the up-down movable member extends in opposite directions and is inserted in the guide slots of the guides disposed on the opposite sides.

10. The variable spoiler apparatus according to claim 8, wherein the length-variable unit comprises:
    a rotating bracket rotatably installed on the end of the spoiler;
    a second motor installed on the up-down movable member and configured to transmit rotating force; and
    a connection shaft extending from the second motor and threadedly coupled to the rotating bracket so that, when the second motor is operated, the rotating bracket is moved in the up-down direction by rotation of the connection shaft.

11. The variable spoiler apparatus according to claim 1, wherein the bumper back beam is installed in a rear of the vehicle, and when the spoiler is moved downward, the spoiler is extracted forward in a diagonal direction.

12. The variable spoiler apparatus according to claim 1, wherein the length-variable unit of the first drive device is coupled to a front end of the spoiler.

13. A vehicle with a variable rear spoiler apparatus, the variable rear spoiler comprising:
    a linkage device installed on a bumper back beam and configured to be rotated and having a length varying in a vertical direction during a rotation operation of the linkage device;

a spoiler coupled to the linkage device and configured to be moved in the vertical direction during the rotation operation of the linkage device;

a first drive device installed on the bumper back beam, the first drive device comprising a first rotating shaft coupled to the linkage device to transmit a rotating force, the first drive device being configured to rotate the first rotating shaft so as to provide the rotation operation of the linkage device;

a guide rotatably installed on the bumper back beam and the guide being extendable in the vertical direction; and a second drive device coupled to the guide and movable in the vertical direction, the second drive device comprising a length-variable unit coupled to an end of the spoiler, wherein the second drive device is configured such that when the linkage device is rotated, the second drive device along with the spoiler moves in the vertical direction along the guide, and when the second drive device is operated, the spoiler is tilted by a length variation operation of the length-variable unit.

14. The vehicle according to claim 13, wherein the linkage device comprises:

a fixing bracket fixed to the bumper back beam, and to which the first rotating shaft is penetrated and connected;

a drive link including a first end that is installed on the fixing bracket and coupled with the first rotating shaft so that the drive link rotates along with the first rotating shaft;

a support link including a first end rotatably coupled to the fixing bracket through a connection link, and a second end rotatably coupled to the spoiler; and a driven link including a first end rotatably coupled to the drive link, and a second end rotatably coupled to the second end of the support link.

15. The vehicle according to claim 14, wherein the drive link and the driven link are configured such that, when the spoiler is completely moved downward, the drive link and the driven link that have been in a folded state are unfolded to have an approximately vertical orientation.

16. The vehicle according to claim 14, wherein the driven link extends from the first end thereof to the second end in a curved shape.

17. The vehicle according to claim 14, wherein the connection link is rotatably coupled at a first end thereof to the fixing bracket, and is rotatably coupled at a second end thereof to the first end of the support link, and the connection link comprises a plurality of connection links provided parallel with each other.

18. The vehicle according to claim 14, wherein the first drive device comprises:

a first motor installed on a back beam bracket fixed on the bumper back beam and configured to transmit rotating force; and the first rotating shaft extending in opposite directions from the first motor, and penetrated into the fixing bracket and connected to the drive link.

19. The vehicle according to claim 14, wherein the guide has a guide slot extending in the up-down direction, and wherein the second drive device comprises an up-down movable member provided with a guide shaft that is disposed in the guide slot of the guide, and the up-down movable member is coupled with the length-variable unit coupled to the spoiler.

20. A method of operating a variable rear spoiler apparatus of a rear bumper for a vehicle, the method comprising:

transmitting a rotating force by rotating a first rotating shaft of a first drive device, the first drive device being installed on a bumper back beam;

rotating a linkage device installed on a bumper back beam, the linkage device having a length varying in a vertical direction during the rotating of the linkage device, wherein the first rotating shaft is coupled to the linkage device;

providing a spoiler coupled to the linkage device and configured to be moved in the vertical direction during the rotation operation of the linkage device;

providing a guide rotatably installed on the bumper back beam and being extendable in the vertical direction;

rotating the linkage device to move a second drive device along with the spoiler in the vertical direction along the guide, the second drive device coupled to the guide; and tilting the spoiler by a length variation operation of a length-variable unit coupled to an end of the spoiler.

* * * * *